United States Patent [19]

Ueda et al.

[11] Patent Number: 4,786,331
[45] Date of Patent: Nov. 22, 1988

[54] CEMENT DISPERSION AGENT

[75] Inventors: Shigeyuki Ueda; Yoshimitsu Sekiguchi, both of Chiba; Kazuaki Yamaguchi, Funabashi, all of Japan

[73] Assignee: Lion Corporation, Tokyo, Japan

[21] Appl. No.: 72,306

[22] Filed: Jul. 13, 1987

[30] Foreign Application Priority Data

Jul. 18, 1986 [JP] Japan ................................ 61-168104
Oct. 3, 1986 [JP] Japan ................................ 61-236014

[51] Int. Cl.$^4$ .............................................. C04B 24/20
[52] U.S. Cl. ...................................... 106/314; 106/90;
524/3; 524/8
[58] Field of Search ................ 524/3, 8; 106/90, 314

[56] References Cited

U.S. PATENT DOCUMENTS

| | | | |
|---|---|---|---|
| 2,865,876 | 12/1958 | Scott | 524/8 |
| 4,073,658 | 2/1978 | Ohtani et al. | 106/314 |
| 4,076,699 | 2/1978 | Grimaud et al. | 524/8 |
| 4,325,736 | 4/1982 | Okada et al. | 106/90 |

FOREIGN PATENT DOCUMENTS

| | | | |
|---|---|---|---|
| 1162951 | 2/1984 | Canada | 524/8 |
| 51-525 | 1/1976 | Japan . | |
| 56-41866 | 4/1981 | Japan . | |
| 57-20354 | 2/1982 | Japan . | |
| 57-156355 | 9/1982 | Japan . | |
| 58-2250 | 1/1983 | Japan . | |
| 58-2249 | 1/1983 | Japan . | |
| 60-46956 | 3/1985 | Japan . | |
| 60-23575 | 11/1985 | Japan . | |
| 61-27344 | 6/1986 | Japan . | |

*Primary Examiner*—Steven Capella
*Attorney, Agent, or Firm*—Armstrong, Nikaido, Marmelstein & Kubovcik

[57] ABSTRACT

A cement dispersion agent comprising calcium polystyrene sulfonate having a weight average molecular weight of 5,000 to 50,000 and having a sulfonation degree of 80% or more. Further, a cement dispersion agent comprising (a) a polystyrene sulfonate and (b) at least one component selected from the group consisting of hydroxycarboxylic acids, ketocarboxylic acids, and the salts thereof.

12 Claims, No Drawings

CEMENT DISPERSION AGENT

BACKGROUND OF THE INVENTION

1. Field of the Invention

The present invention relates to a dispersion agent for cement (hereinafter, cement dispersion agent) capable of providing an excellent dispersibility without causing an alkali-aggregate reaction. The present invention also relates to a cement dispersion agent capable of improving the flowability of a cement mix such as cement paste, mortar, and concrete and of preventing the decrease in the flowability over a period of time when incorporated therein.

2. Description of the Related Art

Cement dispersion agents are formulated into cement mixes such as cement paste, mortar, and concrete to improve the dispersibility thereof and to reduce the water content in the mixes. Naphthalene sulfonic acid-formaldehyde condensate products are used at present in the art as such cement dispersion agents, but completely satisfactory effects have not been obtained from these products.

Further, problems have arisen because of alkali-aggregate reactions caused by fluctuations in the content of recently supplied concrete aggregate materials. These alkali-aggregate reactions cause expansion after construction, generating cracks, etc., in the cement mix products. The use of low alkali cement or good quality aggregate material has been proposed to inhibit these alkali-aggregate reactions, but low alkali cement is expensive and increases construction costs and a supply of good quality aggregate materials cannot be always ensured. Thus, this proposal is not practical.

No. JP-A-60-235756 (Kokai) proposes a method of producing the calcium salts of aromatic sulfonic acid-formaldehyde condensate products, since the amount of alkali metals present in cement distribution agents can not be ignored as a factor contributing to the alkali-aggregate reactions. However, the properties of these cement distribution agents are not satisfactory, as mentioned above.

The use of polyethylene sulfonates or the copolymers thereof as a cement distribution agent is disclosed in, for example, No. JP-A-51-525, 57-156355, and 60-46956 (Kokai) and U.S. Pat. No. 4076699. The calcium salt is disclosed as one of the salts therein, but no teaching as to the alkali-aggregate reaction is mentioned. Furthermore, although No. JP-A-51-525 teaches that, since the low sulfonation degree of polystyrene sulfonates exhibits hydrophobic properties, which cause an insufficient initial dispersibility and unsatisfactory strength improvement, an average substitution of 0.5 or more, preferably 0.7 or more, based on one styrene group, of a sulfonic acid group is recommended. However, the effects obtained from the use of the higher sulfonation degree are not taught at all in this reference.

Quality control requirements have recently become severe, in line with the increased large scale use of, for example, cement, concrete, and mortar. Accordingly, the use of ready mixed concrete, which is transported in large amounts and over long distances by special vehicles from the concrete production plants, has remarkably increased. During such transportation, however, a so-called "slump loss" phenomenon occurs in the ready mixed concrete, i.e., the flowability of the ready mixed concrete is reduced with the elapse of time because the cement particles coagulated when a certain time has elapsed after mixing. This phenomenon is particularly remarkable when naphthalene sulfonic acidformaldehyde condensate dispersion agents are used. Furthermore, although the amount of water in a concrete mix should be decreased to increase the strength of concrete, a reduction in the water content accelerates the generation of the "slump loss" phenomenon.

Accordingly, the ready mixed concrete to be transported by a special vehicle is adjusted, during the production thereof, so that it has a suitable flowability from the viewpoint of workability at a construction site. However, there are technical limitations to the amount of adjustment that can be made as is known in the art. Further, even when the above-mentioned adjustment is made, the time required for transportation varies with each special vehicle, due to variances in transportation time, traffic conditions, and waiting time in the case of a large scale placing of concrete. When the "slump loss" is large, the pumping of the ready mixed concrete becomes difficult and causes problems Furthermore, since the ready mixed concrete has a poor flowability during placing, voids are formed in the concrete and various other disadvantageous inconveniences occur. For example, the load during compaction by a vibrator become increased, and the finish is non-uniform. Also in the cases of production of concrete molded articles such as concrete plates, concrete piles, etc., the "slump loss" may cause the production of non-uniform and off-spec products.

Various proposals have heretofore been made of additives, and the addition methods thereof, for improving the flowability of concrete mixes.

For example, it was proposed in No. JP-B-61-27344 (Kokoku) to prevent the decrease in the flowability with the elapse of time by adding gluconic acid salts to salts of naphthalene sulfonic acid-formaldehyde condensate products. However, a large amount of these additives must be used, and the effects obtained therefrom are still unsatisfactory.

It has been also proposed to prevent the decrease in the flowability with the elapse of time at a low temperature by adding malates (see No. JP-A-58-2249) or citrates (see No. JP-A-58-2250) to naphthalene sulfonic acid-formaldehyde condensate products. However, these references do not report that, at an ambient temperature or at an elevated temperature, a remarkable decrease in the flowability occurs with the elapse of time.

Furthermore, Nos. JP-A-51-525 and 56-41866 report the addition of polystyrene sulfonates to cement mixes as a dispersion agent. However, although polystyrene sulfonate dispersion agents improve the flowability, there is still a problem in that there is still a remarkable decrease in the flowability with the elapse of time.

SUMMARY OF THE INVENTION

Accordingly, an object of the present invention is to eliminate the above-mentioned problems in the prior art and to provide a cement diffusion agent capable of providing a good flowability to a cement mix without easily causing the undesirable alkali-aggregate reactions.

Another object of the present invention is to provide a cement dispersion agent capable of improving the flowability of a cement mix and of effectively preventing a reduction of the flowability with the elapse of time.

Other objects and advantages of the present invention will be apparent from the following description.

In accordance with the first embodiment of the present invention, there is provided a cement dispersion agent comprising calcium polystyrene sulfonate having a weight average molecular weight of 5,000 to 100,000 and having a sulfonation degree of 80% or more.

In accordance with the second embodiment of the present invention, there is also provided a cement dispersion agent comprising (a) a polystyrene sulfonate and (b) at least one component selected from the group consisting of hydroxycarboxylic acids, ketocarboxylic acids, and the salts thereof.

DESCRIPTION OF THE PREFERRED EMBODIMENT

The cement dispersion agent according to the first embodiment of the present invention comprises calcium polystyrene sulfonate having a weight average molecular weight of 5,000 to 100,000, preferably 5000 to 50,000. When the weight average molecular weight of calcium polystyrene sulfonate is not within the above-mentioned range, a sufficient dispersibility cannot be obtained because of the small adsorption amount in the case of the weight average molecular weight of less than 5,000, and because of the cohesive function in the case of the weight average molecular weight of more than 100,000. Furthermore, the sulfonation degree of the calcium polystyrene sulfonate is preferably 80% or more. Thus, the desired dispersibility can be realized when 0.8 or more of a sulfonic acid group based upon one styrene unit, on average, is introduced into the sulfonate by increasing the sulfonation degree.

The calcium polystyrene sulfonate usable in the present invention can be prepared by directly sulfonating polystyrene having the desired molecular weight with a sulfonating agent (e.g., sulfuric anhydride, oleum) in a conventional manner, followed by neutralizing, after removing unreacted polystyrene by filtration, the sulfonated polystyrene with a calcium compound such as calcium hydroxide or calcium carbonate. The by-product calcium sulfate is recovered, after neutralization, to obtain the desired calcium polystyrene sulfonate having the above-mentioned sulfonation degree.

The calcium polystyrene sulfonate can be advantageously added to a cement mix such as cement paste, mortar, or concrete, preferably in an amount of 0.02 to 3.0 parts by weight, more preferably 0.04 to 2.0 parts by weight, based on 100 parts by weight of cement. When the addition amount of the calcium polystyrene sulfonate is too small, the desired dispersibility can not be obtained. Conversely, when the addition amount of the calcium polystyrene sulfonate is too large, the cement particles are abnormally dispersed and separation occurs, and thus the desired strength cannot be obtained.

The cement dispersion agent according to the first embodiment may optionally include, in addition to the above-mentioned calcium polystyrene sulfonate, any conventional cement additives. Examples of such additives are polyvinyl alcohol (see No. JP-A-57-20354), oligo-saccharide (see U.S. Pat. No. 4073658), and reaction products of unsaturated dicarboxylic acids and alkenes (see U.S. Pat. No. 4325736).

The cement dispersion agent according to the present invention can be prepared and added to a cement mix in any form, e.g., solid, powder, or as an aqueous solution. There are no substantial limitations to the addition period of the present dispersion agent to a cement mix. For example, the present cement dispersion agent may be added at any period from the preparation stage of a cement mix to just before the use thereof at the construction site.

According to the first embodiment of the present invention, the desired dispersibility can be given to a cement mix, an excellent water reducing effect can be obtained, and the generation of cracks, etc., caused by shrinkage can be effectively prevented, when the above-mentioned calcium polystyrene sulfonate is used as a cement dispersion agent. Furthermore, since the undesired alkali-aggregate reactions are inhibited, cracks, etc., caused by expansion are not generated and the mortar and concrete obtained has sufficient strength. Accordingly, the cement dispersion agent according to the present invention is very useful in the fields of, for example, construction and building (or architecture) as well as in the field of concrete secondary products.

The polystyrene sulfonates usable as the component (a) in the cement dispersion agent according to the second embodiment of the present invention can be prepared by directly sulfonating polystyrene with a sulfonating agent (e.g., sulfuric acid, sulfuric anhydride, or oleum) in a conventional manner, followed by neutralizing, after separating the unreacted polystyrene by filtration, with an alkaline compound such as sodium hydroxide or calcium hydroxide. Although there are no critical limitations to the molecular weight of the polystyrene sulfonate, the preferable range of the weight average molecular weight of the polystyrene sulfonate is 5,000 to 100,000, more preferably 5,000 to 50,000.

The component (b) usable in the present cement dispersion agent can be selected from the group consisting of hydroxycarboxylic acids and the salts thereof and ketocarboxylic acids and the salts thereof. Examples of the hydroxylic acids and the salts thereof are gluconic acid, citric acid, tartaric acid, malic acid, glycoheptoic acid, and hydroxybenzoic acid, and the salts thereof (e.g., sodium, potassium, calcium). Examples of the ketocarboxylic acids and the salts thereof are pyruvic acid, benzoylformic acid, acetoacetic acid, benzoylacetic acid, levulinic acid benzoylpropionic acid, and the salts thereof (e.g., sodium, potassium, and calcium).

Although there are no critical limitations to the amount of the component (b) in the present cement dispersion agent, the amount of the component (b) is preferably 1 to 20 parts by weight, more preferably 2 to 15 parts by weight, based on 100 parts by weight of the polystyrene sulfonate component (a); depending upon the addition amount of the present cement dispersion agent to a cement mix.

The cement dispersion agent according to the second embodiment of the present invention can be advantageously added to a cement mix such as cement paste, mortar, or concrete, preferably in an amount of 0.02 to 3.0 parts by weight, more preferably 0.03 to 2.0 parts by weight, based on 100 parts by weight of cement. When the addition amount of the cement dispersion agent is too small, the desired dispersibility can not be obtained. Conversely, when the addition amount of the cement dispersion agent is too large, the cement particles are abnormally dispersed and separation occurs, and thus the desired strength cannot be obtained.

The cement dispersion agent according to the present invention can be prepared and added to a cement mix in any form, e.g., solid, powder, or as an aqueous solution.

There are no substantial limitations to the addition period of the present dispersion agent to a cement mix.

According to the second embodiment of the present invention, the generation of the "slump loss" phenomenon can be effectively prevented without impairing the properties of concrete after hardening, and the flowability of the cement mix before hardening can be stably maintained and in good condition for a long time, by using, in combination, (a) polystyrene sulfonates and (b) hydroxycarboxylic acids, ketocarboxylic acids, and the salts thereof. Accordingly, the handling of the cement mix becomes easy and simple and the quality control of the concrete, etc. becomes extremely easy in practice, and therefore, products having a constant quality can be advantageously obtained.

EXAMPLES

In the following, the present invention is described in more detail by referring to Examples, which by no means limit the scope of the present invention. In the following Examples, "%" and "parts" indicate "% by weight" and "parts by weight", unless otherwise specified.

PREPARATION EXAMPLE OF CALCIUM POLYSTYRENE SULFONATE

A one liter (inner volume) four-necked separable flask was charged with 585 g of dichloroethane, followed by adding 45 g of polystyrene (weight average molecular weight=5500, available from Mitsubishi Petrochemical Co., Ltd. as OS-1000) while stirring. The mixture was dissolved during the stirring. Then, 35 g of sulfuric anhydride was dropwise added, while the reaction temperature was maintained at a temperature of 25° C. to 30° C. After completing the addition of the sulfuric anhydride, the reaction mixture was stirred at the same temperature for 30 minutes, and thereafter, 320 g of water was added to the flask to extract the resultant polystyrene sulfonic acid, followed by filtration. The filtrate was carefully neutralized with 19 g of calcium hydroxide and, after removing the by-product calcium sulfate by filtration, the desired aqueous solution of calcium polystyrene sulfonate was obtained. The weight average molecular weight of the product was 10,000 as determined by GPC measurement. The sulfonation degree was 80% as determined by $^1$H-NMR measurement.

EXAMPLE 1

The amount of water reduction and degree of the expansion of the concrete were evaluated by using various calcium polystyrene sulfonates having various weight average molecular weights and sulfonation degrees. These calcium polystyrene sulfonates were prepared in the same manner as mentioned above. In addition, the same evaluation tests were carried out in the case of the sodium salt and conventional cement dispersion agents. The results are shown in Table 1.

The amount of water reduction was evaluated by preparing concrete having a slump of 18 cm according to a Japanese Industrial Standard (JIS) No. A-6204 method. An amount of 0.3%, in terms of solid content, of the cement dispersion agent was added, based on the weight of the cement.

The degree of expansion was evaluated, to determine the possibilities of the occurrence of an alkali-aggregate reaction, according to an ASTM C 227 method (i.e., "potential alkali reaction test method for cement and aggregate"). A small amount of a reactive aggregate material, opal was added to accelerate an alkali-aggregate reaction. The cement dispersion agent was added in an amount of 0.5%, in terms of the solid content, based on the weight of the cement.

The cement mix composition included 2 parts of Fujigawa sand (specific gravity 2.61) 0.1 part of opal (specific gravity 2.61), and 0.45 parts (0.55 parts when the dispersion agent is not added) of water, based on 1 part of Portland cement ($Na_2O$:0.6%).

As is clear from the results shown in Table 1, the calcium polystyrene sulfonates having a weight average molecular weight of 5,000 to 100,000 and a sulfonation degree of 80% or more exhibited remarkable amount of water reduction. Furthermore, the degree of expansion in the case of the present invention is clearly smaller than that of the alkali metal containing agent and is comparable to that where a dispersion agent is not used.

TABLE 1

| Sample No. | Cement Dispersion Agent | | | Evaluation Results | | |
|---|---|---|---|---|---|---|
| | Compound | Molecular weight | Degree of Sulfonation (%) | Water reduction amount (%) | Degree of expansion (%) | |
| | | | | | 1 month | 2 months |
| 1* | Calcium polystyrene sulfonate | 3,000 | 50 | 5.6 | — | — |
| 2* | " | 3,000 | 70 | 8.1 | — | — |
| 3* | " | 3,000 | 80 | 10.4 | 0.26 | 0.32 |
| 4* | " | 5,000 | 50 | 7.1 | — | — |
| 5* | " | 5,000 | 70 | 10.5 | — | — |
| 6 | " | 5,000 | 80 | 15.6 | 0.26 | 0.32 |
| 7* | " | 10,000 | 70 | 11.8 | — | — |
| 8 | " | 10,000 | 80 | 15.4 | 0.26 | 0.32 |
| 9 | " | 10,000 | 90 | 15.6 | 0.25 | 0.32 |
| 10 | " | 50,000 | 80 | 14.5 | 0.25 | 0.32 |
| 11* | " | 100,000 | 80 | 11.2 | — | — |
| 12* | No addition | — | — | — | 0.26 | 0.32 |
| 13* | Calcium naphthalene sulfonate-formaldehyde condensate product | 1,500 | 95 | 6.5 | 0.26 | 0.33 |
| 14* | Calcium naphthalene sulfonate-formaldehyde condensate product | 3,000 | 95 | 10.5 | 0.26 | 0.32 |
| 15* | Calcium lignin sulfonate | 10,000 | 90 | 12.2 | 0.26 | 0.33 |
| 16* | Sodium polystyrene sulfonate | 10,000 | 80 | 15.4 | 0.34 | 0.42 |

*Comparative Examples

EXAMPLE 2

The mix compositions listed in Table 2 were weighed until a total mix amount of 40 liters was obtained. The weighed components were charged into an Eirich mixer and the mixture was mixed for 90 seconds.

A cover was provided to ensure that the water content of the concrete was not lost and the mixture was allowed to stand for 15 minutes. Thereafter, the mixture was mixed for 15 seconds and the mixture was recovered from the mixer. The slump value was then determined according to a JIS-A-No.1101 method (i.e., before the addition of the dispersing agent).

The mixture was then returned to the mixer and various cement dispersion agents according to the present invention listed in Table 3 were independently added, followed by mixing for 30 seconds. The slump value was again determined (i.e., immediately after the addition of the dispersion agent).

The mixture was returned to the mixer and allowed to stand for 15 minutes. The mixture was then mixed for 30 seconds, followed by a determination of the slump value. Thereafter, the slump values were determined at every 15 minutes in the same way as mentioned above, and thus, the changes in the slump values with the elapse of time were determined. As a comparative test, the same evaluation was carried out for the case wherein only polystyrene sulfonate was used (i.e. Sample No. 1).

The results are shown in Table 3.

TABLE 2

| Mix Composition of Base Concrete | | |
| --- | --- | --- |
| Water/Cement ratio (%) | | 58 |
| Base slump (cm) | | 12.0 |
| Fine aggregate ratio (%) | | 45 |
| Unit weight (kg/m$^3$) | Water | 175 |
| | Cement | 300 |
| | Fine aggregate | 818 |
| | Coarse aggregate | 1011 |
| Chemical admixture (% based on cement) | | 0.13*$^1$ |

*$^1$in terms of solid content
Remarks:
Cement: Normal Portland cement
Fine aggregate: Kisarazu river sand (specific gravity = 2.64, fineness modulus = 2.42)
Coarse aggregate: Tsukui lake crushed stone (specific gravity = 2.66, fineness modulus = 6.95)
Chemical admixture: Pozzolith No. 70 (available from Nisso Master Builders Co.)

TABLE 3

| | Cement Dispersion Agent | | | Addition amount/ amount of cement (%) | | Slump Value (cm) | | | | | |
| --- | --- | --- | --- | --- | --- | --- | --- | --- | --- | --- | --- |
| | Polystyrene sulfonate (A) | | Hydroxy (or keto) carboxylate (B) | | | | Immediately after addition | | | | |
| Sample No. | Counter ion | Molecular weight | | (A) | (B) | Before addition | | 15 min | 30 min | 45 min | 60 min |
| 1* | Na | 10,000 | None | 0.1 | — | 12.1 | 19.8 | 15.7 | 13.1 | 11.0 | 8.7 |
| 2 | Na | 10,000 | Sodium gluconate | 0.1 | 0.006 | 11.9 | 19.9 | 18.1 | 16.0 | 15.0 | 13.5 |
| 3 | Na | 10,000 | Sodium citrate | 0.1 | 0.006 | 11.9 | 19.9 | 18.2 | 15.9 | 14.5 | 13.4 |
| 4 | Na | 10,000 | Sodium pyruvate | 0.1 | 0.006 | 12.2 | 19.5 | 18.0 | 16.1 | 15.1 | 13.4 |
| 5 | Na | 20,000 | Sodium gluconate | 0.1 | 0.006 | 12.0 | 19.6 | 17.9 | 15.9 | 15.0 | 13.5 |
| 6 | Na | 20,000 | Sodium citrate | 0.1 | 0.006 | 12.0 | 19.6 | 17.8 | 16.2 | 15.2 | 13.6 |
| 7 | Na | 20,000 | Sodium pyruvate | 0.1 | 0.006 | 12.1 | 19.8 | 17.5 | 16.1 | 15.1 | 13.5 |
| 8 | Ca | 10,000 | Sodium gluconate | 0.1 | 0.006 | 12.3 | 19.7 | 18.1 | 15.8 | 15.0 | 14.0 |
| 9 | Ca | 10,000 | Sodium citrate | 0.1 | 0.006 | 12.4 | 19.9 | 17.6 | 15.7 | 14.8 | 13.9 |
| 10 | Ca | 10,000 | Sodium pyruvate | 0.1 | 0.006 | 11.8 | 19.1 | 18.0 | 16.0 | 14.9 | 13.6 |

*Comparative Example

EXAMPLE 3

A concrete mix was obtained containing calcium polystyrene sulfonate (weight average molecular weight = 20,000) and sodium gluconate in the addition amounts listed in Table 4, in the same manner as in Example 2.

The results are shown in Table 4.

As is clear from the results shown in the above-mentioned Examples 2 and 3, when the present cement dispersion agent is used, the desired flowability can be obtained and, in addition, the slump values can be maintained for a long time.

TABLE 4

| Addition Amount/Amount of Cement (%) | | Slump Value (cm) | | | | | |
| --- | --- | --- | --- | --- | --- | --- | --- |
| Calcium polystyrene sulfonate (Molecular weight 20,000) | Sodium gluconate | Before addition | Immediately after addition | 15 min | 30 min | 45 min | 60 min |
| 0.1 | 0.002 | 12.1 | 19.8 | 16.8 | 14.5 | 12.5 | 11.5 |
| 0.1 | 0.005 | 12.0 | 19.9 | 17.8 | 15.5 | 14.5 | 13.5 |
| 0.1 | 0.008 | 12.0 | 19.9 | 18.8 | 16.5 | 15.5 | 14.5 |

We claim:
1. A cement dispersion agent comprising calcium polystyrene sulfonate having a weight average molecular weight of 5,000 to 100,000 and having a degree of sulfonation of 80% or more.
2. A cement dispersion agent as claimed in claim 1, wherein said polystyrene sulfonate is obtained by sulfonating polystyrene with a sulfonating agent, followed by neutralizing with a calcium compound.
3. A cement dispersion agent comprising (a) a polystyrene sulfonate and (b) at least one component selected from the group consisting of hydroxycarboxylic acids, ketocarboxylic acids, and the salts thereof.

4. A cement dispersion agent as claimed in claim 3, wherein said polystyrene sulfonate is obtained by sulfonating polystyrene with a sulfonating agent.

5. A cement dispersion agent as claimed in claim 3, wherein the weight average molecular weight of polystyrene sulfonate is 5,000 to 100,000.

6. A cement dispersion agent as claimed in claim 3, wherein the component (b) is selected from the group consisting of gluconic acid, citric acid, tartaric acid, malic acid, glycoheptoic acid, hydroxybenzoic acid and the salts thereof.

7. A cement dispersion agent as claimed in claim 3, wherein the component (b) is selected from the group consisting of pyruvic acid, benzoylformic acid, acetoacetic acid, benzoylacetic acid, levulinic acid benzoylpropionic acid, and the salts thereof.

8. A cement dispersion agent as claimed in claim 3, wherein the amount of the component (b) is 1 to 20 parts by weight, based on 100 parts by weight of the polystyrene sulfonate component (a), in the dispersion agent.

9. A cement mix containing 0.02 to 3.0 parts by weight, based on 100 parts by weight of cement, of the cement dispersion agent of claim 1.

10. A cement mix containing 0.02 to 3.0 parts by weight, based on 100 parts by weight of cement, of the cement dispersion agent of claim 3.

11. A method for dispersing cement by using the cement dispersing agent of claim 1.

12. A method for dispersing cement by using the cement dispersing agent of claim 3.

* * * * *